United States Patent
Komuro et al.

(10) Patent No.: US 12,512,239 B2
(45) Date of Patent: Dec. 30, 2025

(54) SOFT MAGNETIC IRON SHEET, METHOD FOR PRODUCING SOFT MAGNETIC IRON SHEET, AND, IRON CORE AND DYNAMO-ELECTRIC MACHINE, EACH USING SOFT MAGNETIC IRON SHEET

(71) Applicant: Hitachi, Ltd., Tokyo (JP)

(72) Inventors: Matahiro Komuro, Tokyo (JP); Yusuke Asari, Tokyo (JP); Kazuya Shinagawa, Tokyo (JP); Shinya Tamura, Tokyo (JP); Tomohiro Tabata, Tokyo (JP); Shohei Terada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 424 days.

(21) Appl. No.: 18/019,518

(22) PCT Filed: May 11, 2021

(86) PCT No.: PCT/JP2021/017841
§ 371 (c)(1),
(2) Date: Feb. 3, 2023

(87) PCT Pub. No.: WO2022/070497
PCT Pub. Date: Apr. 7, 2022

(65) Prior Publication Data
US 2023/0290551 A1    Sep. 14, 2023

(30) Foreign Application Priority Data
Sep. 29, 2020 (JP) ................. 2020-163548

(51) Int. Cl.
*H01F 1/16* (2006.01)
*C21D 1/18* (2006.01)
(Continued)

(52) U.S. Cl.
CPC ................. *H01F 1/16* (2013.01); *C21D 1/18* (2013.01); *C21D 1/76* (2013.01); *C21D 3/08* (2013.01);
(Continued)

(58) Field of Classification Search
CPC ... C21D 1/18; C21D 1/76; C21D 3/08; C21D 6/007; C21D 9/46; C21D 2211/001; C23C 8/26
See application file for complete search history.

(56) References Cited

U.S. PATENT DOCUMENTS

| | | |
|---|---|---|
| 2015/0299819 A1 | 10/2015 | Hayakawa et al. |
| 2016/0042849 A1 | 2/2016 | Wang et al. |
| 2022/0042157 A1 | 2/2022 | Komuro et al. |

FOREIGN PATENT DOCUMENTS

| | | |
|---|---|---|
| JP | 1-319632 A | 12/1989 |
| JP | 5-263198 A | 10/1993 |

(Continued)

OTHER PUBLICATIONS

KR 20150104233. Original and machine translation (Year: 2015).*
(Continued)

*Primary Examiner* — Tima M. Mcguthry-Banks
(74) *Attorney, Agent, or Firm* — Crowell & Moring LLP

(57) ABSTRACT

The present invention provides a soft magnetic iron sheet exhibiting a high saturation magnetic flux density and a low iron loss as compared with an electromagnetic pure iron sheet, a method for producing the soft magnetic iron sheet, and, an iron core and a dynamo-electric machine, each using the soft magnetic iron sheet. The soft magnetic iron sheet according to the present invention includes: iron as a main component; and nitrogen, in which the soft magnetic iron sheet includes, along a thickness direction of the soft magnetic iron sheet: a high nitrogen concentration layer having (Continued)

a nitrogen concentration of 2 at. % to 11 at. %; a low nitrogen concentration layer having a nitrogen concentration of half or less of the nitrogen concentration of the high nitrogen concentration layer; and a nitrogen concentration transition layer connecting the nitrogen concentration of the high nitrogen concentration layer and the nitrogen concentration of the low nitrogen concentration layer, and wherein a surface layer region including at least both main surfaces of the soft magnetic iron sheet is the low nitrogen concentration layer.

12 Claims, 7 Drawing Sheets

(51) Int. Cl.
    *C21D 1/76*     (2006.01)
    *C21D 3/08*     (2006.01)
    *C21D 6/00*     (2006.01)
    *C21D 9/46*     (2006.01)
    *C22C 38/00*     (2006.01)
    *C22C 38/10*     (2006.01)
    *C22C 38/12*     (2006.01)
    *H02K 1/02*     (2006.01)

(52) U.S. Cl.
    CPC ............... *C21D 6/007* (2013.01); *C21D 9/46* (2013.01); *C22C 38/001* (2013.01); *C22C 38/10* (2013.01); *C22C 38/12* (2013.01); *H02K 1/02* (2013.01); *C21D 2211/001* (2013.01); *C22C 2202/02* (2013.01)

(56) References Cited

FOREIGN PATENT DOCUMENTS

| | | | |
|---|---|---|---|
| JP | 7-118703 A | | 5/1995 |
| JP | 2003-277893 A | | 10/2003 |
| JP | 2005-113184 A | | 4/2005 |
| JP | 2007-46074 A | | 2/2007 |
| JP | 2016167907 A | * | 9/2016 |
| JP | 2020-132894 A | | 8/2020 |
| KR | 10-2005-0019948 A | | 3/2005 |
| WO | WO 2014/104393 A1 | | 7/2014 |

OTHER PUBLICATIONS

Machine translation of JP 2016-1679070 A (Year: 2016).*
International Search Report (PCT/ISA/210) issued in PCT Application No. PCT/JP2021/017841 dated Aug. 3, 2021 with English translation (five (5) pages).
Japanese-language Written Opinion (PCT/ISA/237) issued in PCT Application No. PCT/JP2021/017841 dated Aug. 3, 2021 (three (3) pages).
German-language Office Action issued in German Application No. 11 2021 003 186.4 dated Jan. 23, 2025 with English translation (35 pages).
Kleimt, B. et al., "Optimised production of low C and N steel via the electric steelmaking route", Research Fund for Coal and Steel Final Report RFSR-CT-2008-0003, 2013 (6 pages).

* cited by examiner

SOFT MAGNETIC IRON SHEET, METHOD FOR PRODUCING SOFT MAGNETIC IRON SHEET, AND, IRON CORE AND DYNAMO-ELECTRIC MACHINE, EACH USING SOFT MAGNETIC IRON SHEET

TECHNICAL FIELD

The present invention relates to a technique of a magnetic material, and particularly relates to a soft magnetic iron sheet exhibiting both a high saturation magnetic flux density and a low iron loss as compared with an electromagnetic pure iron sheet, a method for producing the soft magnetic iron sheet, and, an iron core and a dynamo-electric machine, each using the soft magnetic iron sheet.

BACKGROUND ART

A plurality of electrical steel sheets or electromagnetic pure iron sheets (e.g., having a thickness of 0.01 to 1 mm) is laminated and used as an iron core for dynamo-electric machines or transformers. In the iron core, it is important to have a high conversion efficiency between electric energy and magnetic energy, and is also important to have a high magnetic flux density and a low iron loss. The saturation magnetic flux density Bs of the material is desirably high to increase the magnetic flux density, and an Fe—Co-based alloy material or an iron nitride material (e.g., $Fe_{16}N_2$) is known as an iron-based material whose Bs is high.

In addition, cost reduction of an iron core is, of course, one of the most important issues. In the related art, technology development for stable and inexpensive production of a material having a high Bs has been actively conducted.

For example, PTL 1 (JP 2007-046074 A) discloses magnetic metal fine particles coated with graphite and containing Fe as a main component, in which the magnetic metal fine particles have a nitrogen content of 0.1 to 5 wt. % and include at least one of $Fe_4N$ and $Fe_3N$. Further, as a method of producing the magnetic metal fine particles, disclosed is a production method including: mixing an iron oxide powder with a carbon-containing powder; heat-treating the mixed powder in a non-oxidizing atmosphere to yield metal fine particles coated with graphite and containing Fe as a main component; and subjecting the fine particles to a nitriding treatment to give the magnetic metal fine particles.

PTL 1 discloses that it is possible to provide magnetic metal fine particles having excellent corrosion resistance and a method of producing the magnetic metal fine particles.

In addition, PTL 2 (WO 2014/104393 A) discloses a production method for a grain-oriented electrical steel sheet, the method comprising: using a steel slab, the steel slab having a composition consisting of, by mass % or mass ppm, C: 0.08% or less, Si: 2.0% to 4.5% and Mn: 0.5% or less, S: less than 50 ppm, Se: less than 50 ppm, O: less than 50 ppm, sol.Al: less than 100 ppm, and N in a range satisfying [sol.Al]×(14/27) ppm≤N≤80 ppm, and the balance being Fe and incidental impurities, wherein after cold rolling and before the start of secondary recrystallization annealing, the cold rolled sheet is subjected to nitriding treatment to obtain a nitrogen content of 50 mass ppm or more and 1000 mass ppm or less, a total content of 0.2 mass % to 15 mass % of a sulfide and/or sulfate is contained in the annealing separator, and a staying time in the temperature range of 300° C. to 800° C. in the heating stage of the secondary recrystallization annealing of 5 hours or more is secured.

PTL 2 describes that silicon nitride ($Si_3N_4$) and MnS are precipitated, and the silicon nitride and MnS are used as an inhibitor for inhibiting normal grain growth, whereby variation of magnetic properties is significantly reduced, and grain-oriented electrical steel sheets with good magnetic properties can be industrially stably produced.

CITATION LIST

Patent Literature

PTL 1: JP 2007-046074 A
PTL 2: WO 2014/104393 A

SUMMARY OF INVENTION

Technical Problem

A powder magnetic core is suitable for relatively small electric components such as noise filters and reactors, whereas an iron core obtained by laminating electrical steel sheets is advantageous for relatively large electric machines such as dynamo-electric machines and transformers, from the viewpoint of mechanical strength.

PTL 1 is considered to be a technique suitable for a powder magnetic core, but it cannot be said that it is suitable for producing and using a thin sheet material such as an electrical steel sheet. PTL 2 is a technique of an electrical steel sheet, but it is disadvantageous in that the Bs of the electrical steel sheet is lower than that of an electromagnetic pure iron sheet. In other words, neither PTL 1 nor PTL 2 discloses a thin sheet material that exhibits higher magnetic properties than the electromagnetic pure iron sheet, and a method for stably and inexpensively producing the thin sheet material.

Moreover, in order to increase the conversion efficiency between electric energy and magnetic energy in the iron core, it is also very important to reduce an iron loss Pi. The Pi is the sum of hysteresis loss and eddy current loss. A coercive force Hc is desirably small to reduce the hysteresis loss, whereas crystal grains are desirably large to reduce the Hc. Further, it is desirable to use a thin sheet having a high electrical resistivity in order to reduce the eddy current loss. However, a technique of stably producing an electrical steel sheet exhibiting a high Bs and a high Pi as compared with an electromagnetic pure iron sheet at low cost has not been established.

Therefore, an object of the present invention is to provide a soft magnetic iron sheet exhibiting a high saturation magnetic flux density and a low iron loss as compared with an electromagnetic pure iron sheet, a method for producing the soft magnetic iron sheet, and, an iron core and a dynamo-electric machine, each using the soft magnetic iron sheet.

Solution to Problem (I) One aspect of the present invention provides a soft magnetic iron sheet including: iron as a main component; and nitrogen, in which the soft magnetic iron sheet includes, in a thickness direction of the soft magnetic iron sheet: a high nitrogen concentration layer having a nitrogen concentration of 2 at. % or more and 11 at. % or less; a low nitrogen concentration layer having a nitrogen concentration of half or less of the nitrogen concentration of the high nitrogen concentration layer; and a nitrogen concentration transition layer connecting the nitrogen concentration of the high nitrogen concentration layer and the nitrogen concentration of the low nitrogen concentration layer, and in which a surface layer region including at least both main surfaces of the soft magnetic iron sheet is the low nitrogen concentration layer.

In the present invention, the soft magnetic iron sheet (I) according to the present invention can be improved and modified as follows.

(i) The nitrogen concentration transition layer has an average nitrogen concentration gradient of 0.1 at. %/μm or more and 10 at. %/μm or less.

(ii) The low nitrogen concentration layer has a nitrogen concentration of 1 at. % or less.

(iii) The soft magnetic iron sheet having a saturation magnetic flux density of more than 2.14 T, and an iron loss, under conditions of a magnetic flux density of 1.0 T and a frequency of 400 Hz, of less than 40 W/kg.

(iv) The soft magnetic iron sheet has a thickness of 0.01 mm or more and 1 mm or less.

(v) The soft magnetic iron sheet includes: an α phase; an α' phase; and an α" phase, in which the α phase is a main phase and the α" phase has a volume ratio of 10% or more.

(vi) The α" phase is a crystal phase in which a ratio of a c-axis length to an a-axis length of lattice constant is different from a ratio of a c-axis length to an a-axis length of lattice constant of $Fe_{16}N_2$ having a stoichiometric composition.

(vii) A total of elements other than the iron and the nitrogen is less than 1 at. %.

(viii) The soft magnetic iron sheet further contains cobalt, in addition to the iron and the nitrogen.

(ix) The soft magnetic iron sheet having a concentration distribution in which a concentration of the cobalt in the surface layer region is higher than a concentration of the cobalt in an inner region, along the thickness direction.

In the present invention, the surface layer region is defined as an outermost layer region including main surfaces along the thickness direction of the iron sheet, and the inner region is defined as a region that is sandwiched between the surface layer regions and excludes the nitrogen concentration transition layer.

(II) Another aspect of the present invention is a method for producing the soft magnetic iron sheet, the method including: a starting material preparation step of preparing a starting material made of a soft magnetic material containing iron as a main component and having a thickness of 0.01 mm or more and 1 mm or less; a nitrogen-concentration-distribution-control heat treatment step of subjecting the starting material to a predetermined nitrogen-concentration-distribution-control heat treatment to form a predetermined nitrogen concentration distribution along a thickness direction of the starting material; and a phase transformation/iron nitride phase formation step of transforming the starting material having the predetermined nitrogen concentration distribution formed into a martensite structure and dispersively forming an iron nitride phase, in which the predetermined nitrogen-concentration-distribution-control heat treatment is a heat treatment performed in a temperature range for forming an austenite phase, and is a combination of a nitrogen immersion heat treatment of introducing and diffusing nitrogen atoms into both main surfaces of the starting material to adjust the nitrogen concentration in the soft magnetic iron sheet to 2 at. % or more and 11 at. % or less, and a denitrogenation heat treatment of releasing nitrogen from both the main surfaces of the starting material to form the low nitrogen concentration layer and the nitrogen concentration transition layer connected to the low nitrogen concentration layer, in the surface layer region.

In the present invention, the method for producing the soft magnetic iron sheet (II) according to the present invention can be improved and modified as follows.

(x) The nitrogen immersion heat treatment is a heat treatment of controlling, in an atmosphere containing an ammonia gas, a partial pressure of the ammonia gas to control a concentration of nitrogen to be introduced and diffused, and the denitrogenation heat treatment is a heat treatment performed by lowering a partial pressure of an ammonia gas and raising a temperature as compared with the nitrogen immersion heat treatment.

(xi) A temperature difference between the denitrogenation heat treatment and the nitrogen immersion heat treatment is 20° C. or higher and 200° C. or lower.

(xii) The phase transformation/iron nitride phase formation step includes quenching of rapidly cooling to lower than 100° C. and a sub-zero treatment of cooling to 0° C. or lower.

(III) According to still another aspect of the present invention, provided is an iron core including a laminated body of soft magnetic iron sheets, in which the soft magnetic iron sheets are the soft magnetic iron sheets according to the present invention.

(IV) According to still another aspect of the present invention, provided is a dynamo-electric machine including an iron core, in which the iron core is the iron core according to the present invention.

Advantageous Effects of Invention

According to the present invention, it is possible to provide a soft magnetic iron sheet exhibiting a high saturation magnetic flux density and a low iron loss as compared with an electromagnetic pure iron sheet, and a method for producing the soft magnetic iron sheet. In addition, the use of the soft magnetic steel sheet makes it possible to provide an iron core having high conversion efficiency between electric energy and magnetic energy as compared with that of an iron core using pure iron and a dynamo-electric machine.

DESCRIPTION OF EMBODIMENTS

[Basic Idea of Present Invention]

Pure iron is advantageous in that it is inexpensive and has a high saturation magnetic flux density Bs (2.14 T). In a Fe—Si-based alloy containing about 1 to 3 mass % of silicon (Si), the iron loss Pi can be greatly reduced as compared with pure iron, but it is disadvantageous in that the Bs is slightly lowered (2.0 T). Further, a Fe—Co-based alloy containing about 50 mass % of cobalt (Co) exhibits a Bs (2.4 T) sufficiently higher than that of pure iron and a Pi lower than that of pure iron. However, it is disadvantageous in that the material cost of Co is higher than that of Fe.

Meanwhile, a soft magnetic material exhibiting a Bs higher than that of pure iron includes the $Fe_{16}N_2$ phase described above. The present inventors have focused on the possibility that the inclusion of N in a soft magnetic material containing Fe as a main component results in formation of a $Fe_{16}N_2$ phase, thereby improving the Bs. However, the $Fe_{16}N_2$ phase is a metastable compound phase, many techniques in the prior art are targeted at powder materials, and there is little knowledge about production techniques of thin sheet materials.

Therefore, with the use as an electromagnetic iron sheet (e.g., having a thickness of 0.01 to 1 mm) in mind, the present inventors have intensively studied a process for stably producing a nitrogen-containing soft magnetic iron sheet exhibiting magnetic properties superior to those of an electromagnetic pure iron sheet using an inexpensive starting material (e.g., an electromagnetic pure iron sheet or an electrical steel sheet).

As a result, the present inventors have found that a starting material is subjected to a predetermined nitrogen-concentration-distribution-control heat treatment in which a nitrogen immersion heat treatment and a denitrogenation heat treatment are combined to form a predetermined nitrogen concentration distribution along a thickness direction, and then the resultant product is subjected to predetermined phase transformation/iron nitride phase formation, thereby enabling stable production of a soft magnetic iron sheet exhibiting a high Bs and a low Pi as compared with pure iron. The present invention has been completed based on this finding.

Hereinafter, embodiments of the present invention will be specifically described with reference to the drawings. The present invention is not limited to the embodiments described herein, and can be appropriately combined with or improved based on a known technique without departing from the technical idea of the invention. Further, the same reference signs are given to the same parts, and overlapping descriptions will be omitted.

[Soft Magnetic Iron Sheet of Present Invention]

Figure 1A:
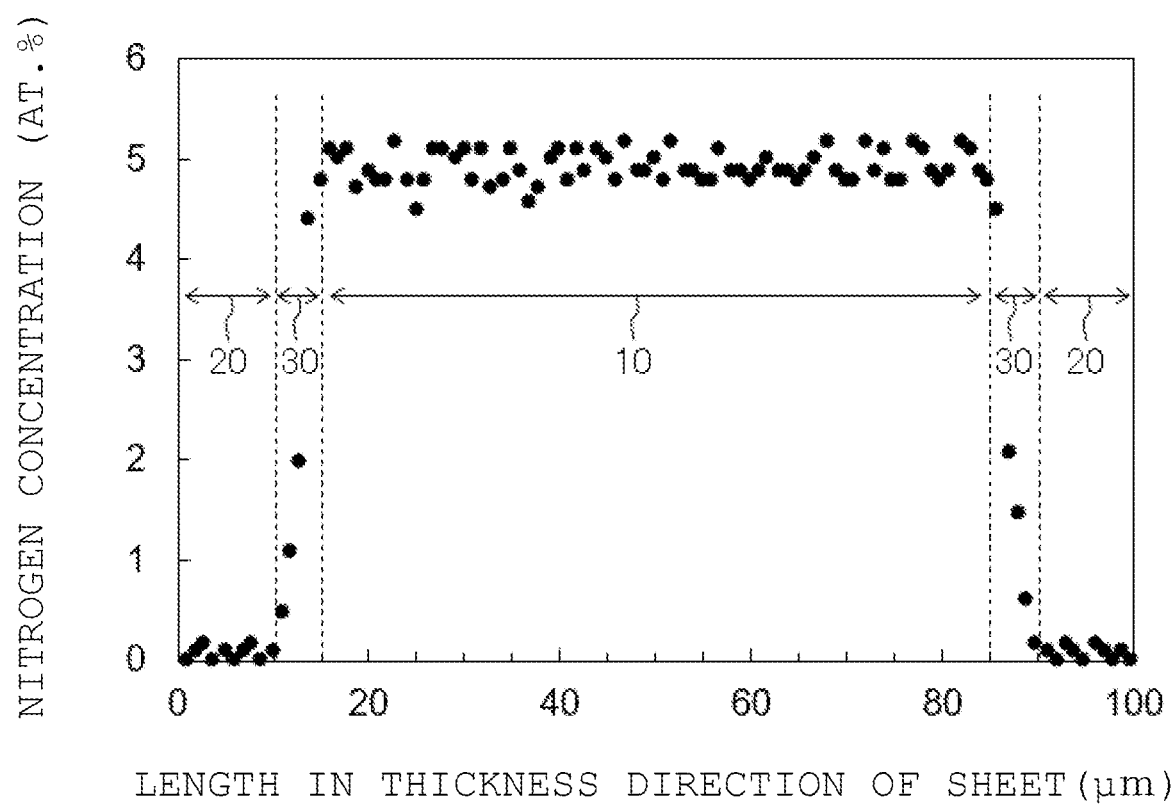
FIG. 1A is a graph showing an example of a relationship between a nitrogen concentration in a soft magnetic iron sheet according to the present invention and a length in a thickness direction of the sheet.
Figure 1B:
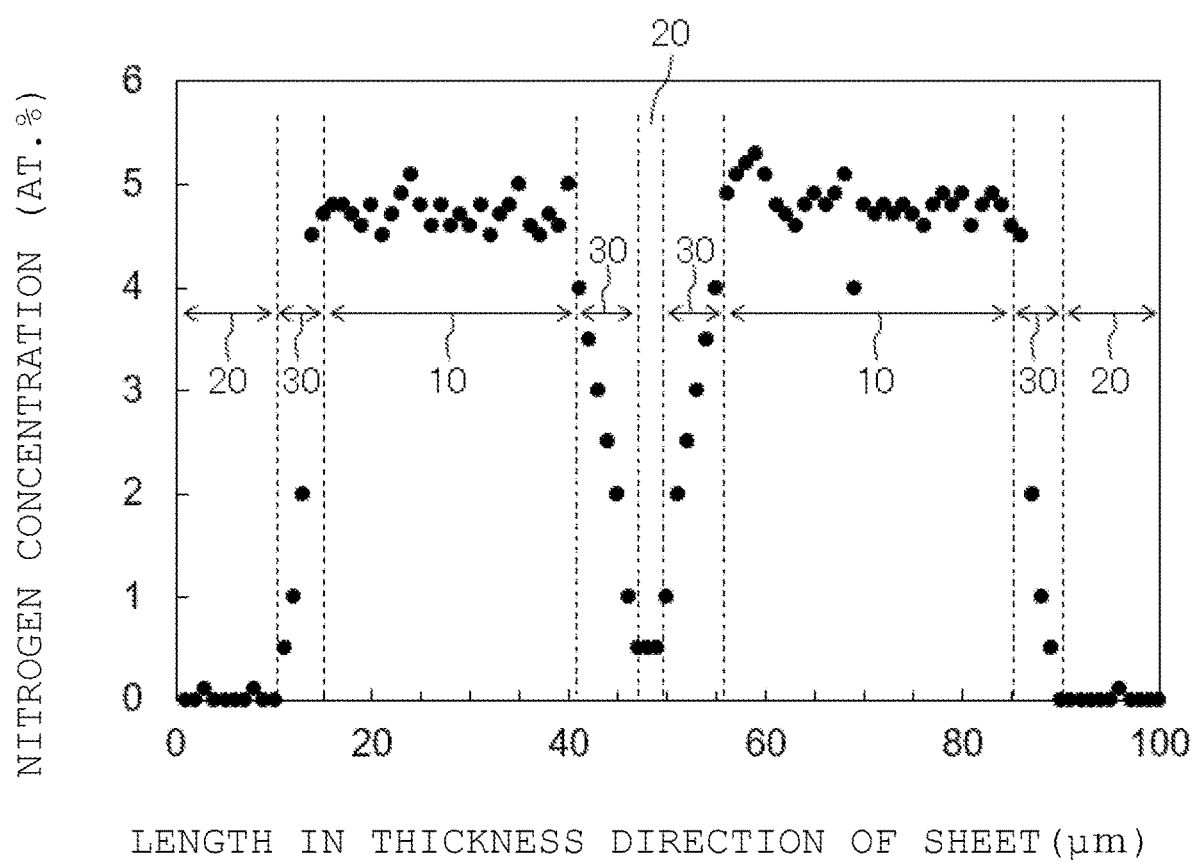
FIG. 1B is a graph showing another example of the relationship between the nitrogen concentration in the soft magnetic iron sheet according to the present invention and the length in the thickness direction of the sheet.
Figure 1C:
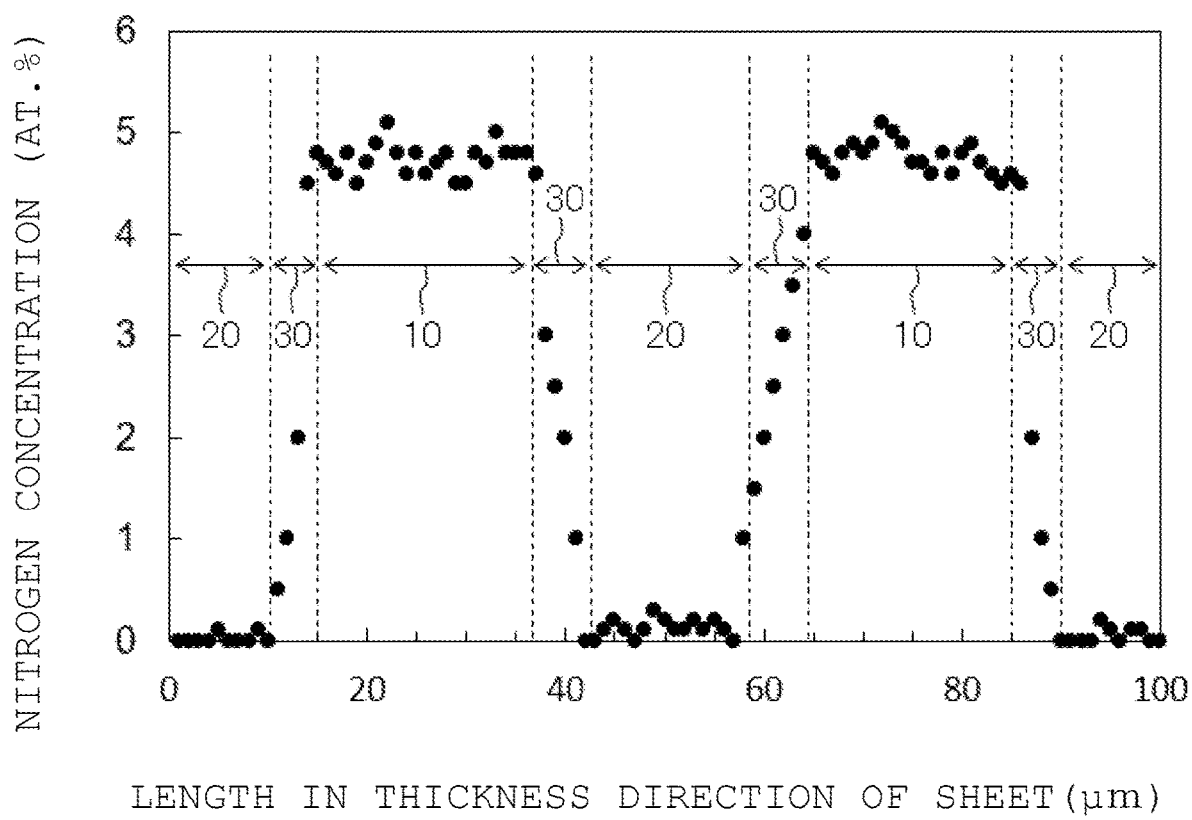
FIG. 1C is a graph showing still another example of the relationship between the nitrogen concentration in the soft magnetic iron sheet according to the present invention and the length in the thickness direction of the sheet.

FIG. 1A is a graph showing an example of a relationship between a nitrogen concentration in a soft magnetic iron sheet according to the present invention and a length in a thickness direction of the sheet. FIG. 1B is a graph showing another example of the relationship between the nitrogen concentration in the soft magnetic iron sheet according to the present invention and the length in the thickness direction of the sheet. FIG. 1C is a graph showing still another example of the relationship between the nitrogen concentration in the soft magnetic iron sheet according to the present invention and the length in the thickness direction of the sheet.

The nitrogen concentration shown in each figure is obtained by performing quantitative analysis with a spot diameter of 1 μm using an electron probe microanalyzer (EPMA: JXA-8800 RL, manufactured by JEOL Ltd.).

As shown in FIGS. 1A to 1C, the soft magnetic iron sheet of the present invention includes, in a thickness direction of the soft magnetic iron sheet: a high nitrogen concentration layer 10 having a nitrogen concentration of 2 at. % or more and 11 at. % or less; a low nitrogen concentration layer 20 having a nitrogen concentration of half or less of the nitrogen concentration of the high nitrogen concentration layer; and a nitrogen concentration transition layer 30 connecting the nitrogen concentration of the high nitrogen concentration layer and the nitrogen concentration of the low nitrogen concentration layer, and in which a surface layer region including at least both main surfaces of the soft magnetic iron sheet is the low nitrogen concentration layer 20. In FIGS. 1B and 1C, in addition to the low nitrogen concentration layers 20 in the surface layer region including both main surfaces, the low nitrogen concentration layer 20 and the nitrogen concentration transition layer 30 are also provided inside the soft magnetic iron sheet. As can be seen from FIGS. 1A to 1C, the nitrogen concentration distribution of the soft magnetic iron sheet of the present invention is line-symmetric about the center in the thickness direction.

The high nitrogen concentration layer 10 preferably has a nitrogen concentration of 2 at. % or more and 11 at. % or less, and more preferably has 2 at. % or more and 9 at. % or less. It is considered that the inclusion of nitrogen at 2 at. % or more causes the α" phase (an ordered martensite phase, a $Fe_{16}N_2$ phase, or a body-centered tetragonal crystal) to be formed in an effective amount (e.g., 10 vol % or more), contributing to an improvement in the Bs of the soft magnetic iron sheet (Bs of more than 2.14 T). Controlling of the concentration of nitrogen to 11 at. % or less suppresses the formation of an undesired phase (e.g., a $Fe_4N$ phase), thereby enabling prevention of a decrease in the Bs (Bs of 2.14 T or less) of the soft magnetic iron sheet.

Although details will be described later, the result of wide-angle X-ray diffraction (WAXD) measurement suggests that the whole of the high nitrogen concentration layer 10 does not become the α" phase, but includes the α phase (a ferrite phase or a body-centered cubic crystal) as the main phase (a phase having the largest volume ratio), and is in a state in which the α" phase and the α' phase (a disordered martensite phase, a $Fe_8N$ phase, or a body-centered tetragonal crystal) are dispersively formed.

In addition, in a case where the ratio "c/a" of the c-axis length to the a-axis length of lattice constant is measured by WAXD, the α" phase in the soft magnetic iron sheet of the present invention is preferably a crystal phase in which the ratio "c/a" is different from the ratio "c/a=1.10" of $Fe_{16}N_2$ having a stoichiometric composition. This means that the crystal lattice of the α" phase is distorted on average. This is because, as compared with the $Fe_{16}N_2$ crystal having a stoichiometric composition, the N atom is lost and the crystal lattice is distorted, and thus an increase in the magnetic moment can be expected as compared with an undistorted crystal lattice.

The volume ratio of the α' phase is not particularly limited, but the volume ratio of the α' phase is preferably 10% or more because there is a possibility that the α' phase is formed as a previous stage of the α" phase formation.

Further, since a γ phase (an austenite phase or a face-centered cubic crystal) is nearly nonmagnetic, when the volume ratio of the γ phase exceeds 5%, the Bs of the soft magnetic iron sheet becomes difficult to exceed the Bs of the electromagnetic pure iron sheet, in conjunction with the reduction of the volume ratio of the α phase. The volume ratio of the γ phase is more preferably 3% or less, and still more preferably 1% or less.

As a result of studies by the present inventors, it has been found that when the entire soft magnetic iron sheet is the high nitrogen concentration layer 10, the Hc tends to increase and the Pi also tends to increase due to large magnetocrystalline anisotropy. Therefore, in the soft magnetic iron sheet of the present invention, the low nitrogen concentration layer 20 having a small Hc is intentionally formed to cause magnetic coupling between the high nitrogen concentration layer 10 and the low nitrogen concentration layer 20, leading to a reduction in the Pi of the entire soft magnetic iron sheet.

In order to clarify the Hc difference between the high nitrogen concentration layer 10 and the low nitrogen concentration layer 20, the nitrogen concentration of the low nitrogen concentration layer 20 is preferably half or less of the nitrogen concentration of the high nitrogen concentration layer 10, more preferably 1 at. % or less, and still more preferably 0.5 at. % or less.

It is also important to form the nitrogen concentration transition layer 30 having a predetermined average concentration gradient between the high nitrogen concentration layer 10 and the low nitrogen concentration layer 20. The nitrogen concentration transition layer 30 is formed, and thus the magnetization state of the low nitrogen concentration layer 20 is easily propagated to the high nitrogen concentration layer 10 (in other words, the magnetic domain wall and magnetization of the high nitrogen concentration layer 10 moves easily). As a result, the Hc is decreased, and the Pi of the entire soft magnetic iron sheet is reduced.

The nitrogen concentration transition layer 30 preferably has an average nitrogen concentration gradient of 0.1 at. %/μm or more and 10 at. %/μm or less. When the average nitrogen concentration gradient is less than 0.1 at. %/μm, it is difficult to overcome the potential of magnetization fixation due to large magnetocrystalline anisotropy of the high nitrogen concentration layer 10. Meanwhile, when the average nitrogen concentration gradient is more than 10 at. %/μm, the concentration gradient is too steep, and magnetic coupling between the high nitrogen concentration layer 10 and the low nitrogen concentration layer 20 hardly occurs.

Regarding the composition of the soft magnetic iron sheet according to the present invention, the regulations other than nitrogen are not particularly limited, and appropriately used are known soft magnetic materials (e.g., electromagnetic pure iron materials, electrical steel sheets, Fe—Si alloy materials, and Fe—Co alloy materials) that can be easily and inexpensively obtained industrially and commercially as thin sheet materials. In other words, in a case where the nitrogen concentration distribution defined in the present invention is formed on the basis of these known soft magnetic materials, it is possible to achieve a high Bs and a low Pi as compared with those of the soft magnetic materials as a base. For example, in a case where an electromagnetic pure iron material is used as a base, it is possible to achieve a Bs of more than 2.14 T and a Pi of less than 40 W/kg (under conditions of a magnetic flux density of 1.0 T and a frequency of 400 Hz).

[Method for Producing Soft Magnetic Iron Sheet of Present Invention]

Figure 2:
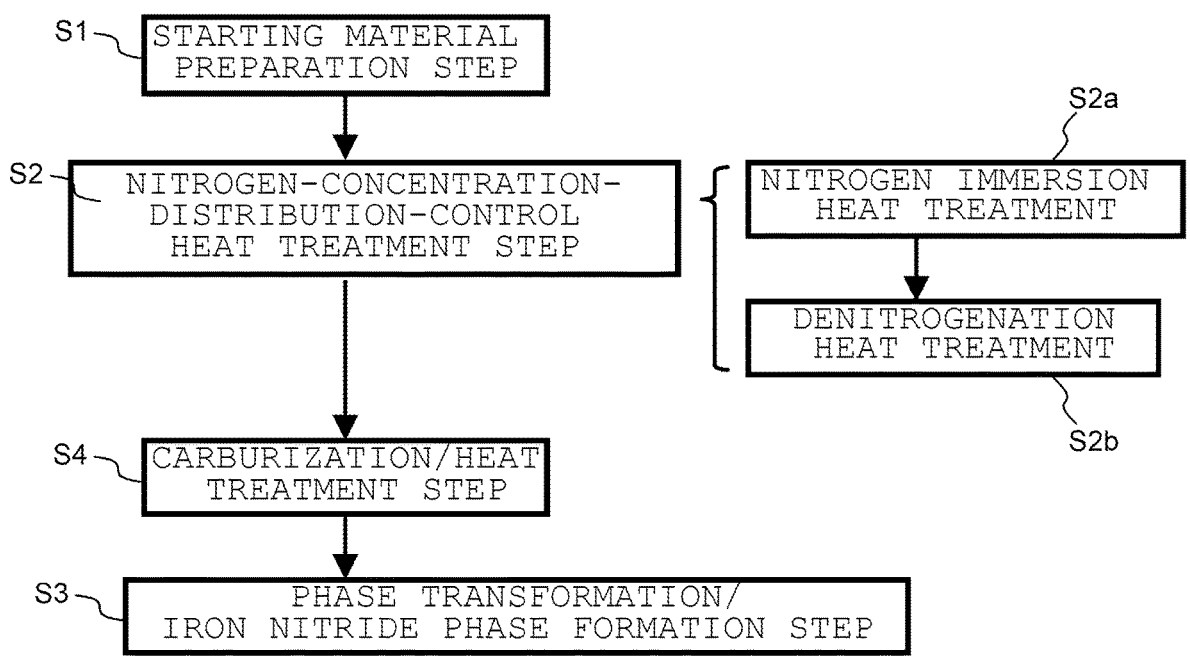
FIG. 2 is a process chart showing an example of a method for producing the soft magnetic iron sheet according to the present invention.

FIG. 2 is a process chart showing an example of a method for producing the soft magnetic iron sheet according to the present invention. As shown in FIG. 2, the method for producing the soft magnetic iron sheet of the present invention schematically includes a starting material preparation step S1, a nitrogen-concentration-distribution-control heat treatment step S2, and a phase transformation/iron nitride phase formation step S3. A carburization/heat treatment step S4 may be further performed between the step S2 and the step S3. Hereinafter, each of the steps will be described more specifically.

(Starting Material Preparation Step)

This step S1 is a step of preparing a thin sheet material (e.g., having a thickness of 0.01 to 1 mm) of a soft magnetic material that can be easily and inexpensively obtained industrially and commercially as a starting material. There is no particular limitation as long as the material is a soft magnetic material containing iron as a main component, and known materials (e.g., electromagnetic pure iron materials, electrical steel sheets, Fe—Si alloy materials, and Fe—Co alloy materials) can be preferably used. Since a content rate of carbon (C) in these soft magnetic materials is low, it becomes relatively easy to control the N concentration distribution in the iron sheet and to form the α" phase in the subsequent steps, which also contributes to a reduction in process cost.

(Nitrogen-Concentration-Distribution-Control Heat Treatment Step)

This step S2 is a step of performing predetermined nitrogen-concentration-distribution-control heat treatment (heat treatment of combining a nitrogen immersion heat treatment S2a and a denitrogenation heat treatment S2b) on the starting material to form a predetermined nitrogen concentration distribution along the thickness direction of the starting material (soft magnetic iron sheet). The production method of the present invention has a great characteristic in the step S2.

The nitrogen immersion heat treatment S2a is a heat treatment of introducing and diffusing nitrogen atoms into both main surfaces of the soft magnetic iron sheet to adjust the nitrogen concentration in the soft magnetic iron sheet to a predetermined concentration, and is performed by heating to a temperature range for forming a γ phase (temperature equal to or higher than the eutectoid transformation point (592° C.), for example, 700 to 900° C.) in the Fe—N-based phase diagram, under an atmosphere containing ammonia (NH$_3$) gas. Ammonia molecules are decomposed on the surface of the soft magnetic iron sheet to introduce and diffuse nitrogen atoms, and thus it is preferable to introduce ammonia gas after the temperature reaches about 500° C. or higher.

The nitrogen concentration of the soft magnetic iron sheet can be controlled mainly by controlling the partial pressure of the ammonia gas. The partial pressure of the ammonia gas can be controlled by, for example, controlling the total pressure in a heat treatment environment and/or mixing with nitrogen (N$_2$) gas. Further, the nitrogen concentration distribution in the thickness direction (in particular, the inner region) can be controlled by intermittently controlling the supply of the ammonia gas (controlling a supply time and a non-supply time) to adjust the balance between the introduction of nitrogen atoms into the soft magnetic iron sheet and the diffusion of nitrogen atoms into the soft magnetic iron sheet.

The denitrogenation heat treatment S2b is a heat treatment of releasing nitrogen from both main surfaces of the soft magnetic iron sheet to form the low nitrogen concentration layer 20 and the nitrogen concentration transition layer 30 connected to the low nitrogen concentration layer, in the surface layer region, and is performed by lowering a partial pressure of an ammonia gas as compared with the nitrogen immersion heat treatment S2a. In order to improve the efficiency of denitrogenation, it is more preferable to perform the nitrogen immersion heat treatment at a higher temperature than the nitrogen immersion heat treatment S2a. The temperature difference between the denitrogenation heat treatment S2b and the nitrogen immersion heat treatment S2a is preferably 20° C. or higher and 200° C. or lower, and more preferably 50° C. or higher and 120° C. or lower.

The nitrogen concentration of the low nitrogen concentration layer 20 in the surface layer region can be controlled mainly by controlling the partial pressure of the ammonia gas. The thickness of the low nitrogen concentration layer 20 can be controlled mainly by controlling the heat treatment time. The average concentration gradient of the nitrogen concentration transition layer 30 can be controlled mainly by controlling the temperature.

(Carburization/Heat Treatment Step)

This step S4 is a heat treatment of introducing carbon into the low nitrogen concentration layer 20 in the surface layer region formed by the denitrogenation heat treatment in the step S2. The step S4 is not an essential step, and the introduction of carbon into the low nitrogen concentration layer 20 in the surface layer region allows the Pi to be reduced without lowering the Bs of the soft magnetic iron sheet.

The method of the carburization/heat treatment is not particularly limited, and known methods (e.g., heat treatment in an acetylene ($C_2H_2$) gas atmosphere) can be preferably used. As an example, the atmosphere gas can be changed to acetylene gas following the denitrogenation heat treatment.

Through this step S2, a soft magnetic iron sheet having the above-described nitrogen concentration distribution as shown in FIGS. 1A to 1C is obtained. FIG. 1A is an example in which nitrogen is uniformly diffused to the center in the thickness direction in the nitrogen immersion heat treatment S2a, FIG. 1B is an example in which the nitrogen diffusion time of the nitrogen immersion heat treatment S2a is set to a time shorter than that in FIG. 1A and the low nitrogen concentration layer 20 and the nitrogen concentration transition layer 30 are formed in the center region in the thickness direction (example in which nitrogen is left), and FIG. 1C is an example in which the nitrogen diffusion time of the nitrogen immersion heat treatment S2a is set to a time much shorter than that in FIG. 1B and the low nitrogen concentration layer 20 and the nitrogen concentration transition layer 30 are formed in the center region in the thickness direction, the layers being thicker than those in FIG. 1B (example in which nitrogen is left).

(Phase Transformation/Iron Nitride Phase Formation Step)

This step S3 is a step of subjecting the soft magnetic iron sheet having the predetermined nitrogen concentration distribution formed in the step S2 to quenching of rapidly cooling to lower than 100° C. to cause the γ phase to be phase-transformed into a martensite structure, and to dispersively form an iron nitride phase (particularly, the α" phase). The quenching method is not particularly limited, and known methods (e.g., oil quenching) can be preferably used.

In order to transform the residual γ phase in the soft magnetic iron sheet into a martensite structure, it is preferable to perform a sub-zero treatment of cooling to 0° C. or lower (e.g., a regular sub-zero treatment using dry ice or a super-sub-zero treatment using liquid nitrogen). As necessary, annealing may be further performed at 100° C. or higher and 210° C. or lower to impart toughness to the soft magnetic iron sheet.

[Iron Core and Dynamo-Electric Machine, Each Using Soft Magnetic Iron Sheet of Present Invention]

Figure 3A:
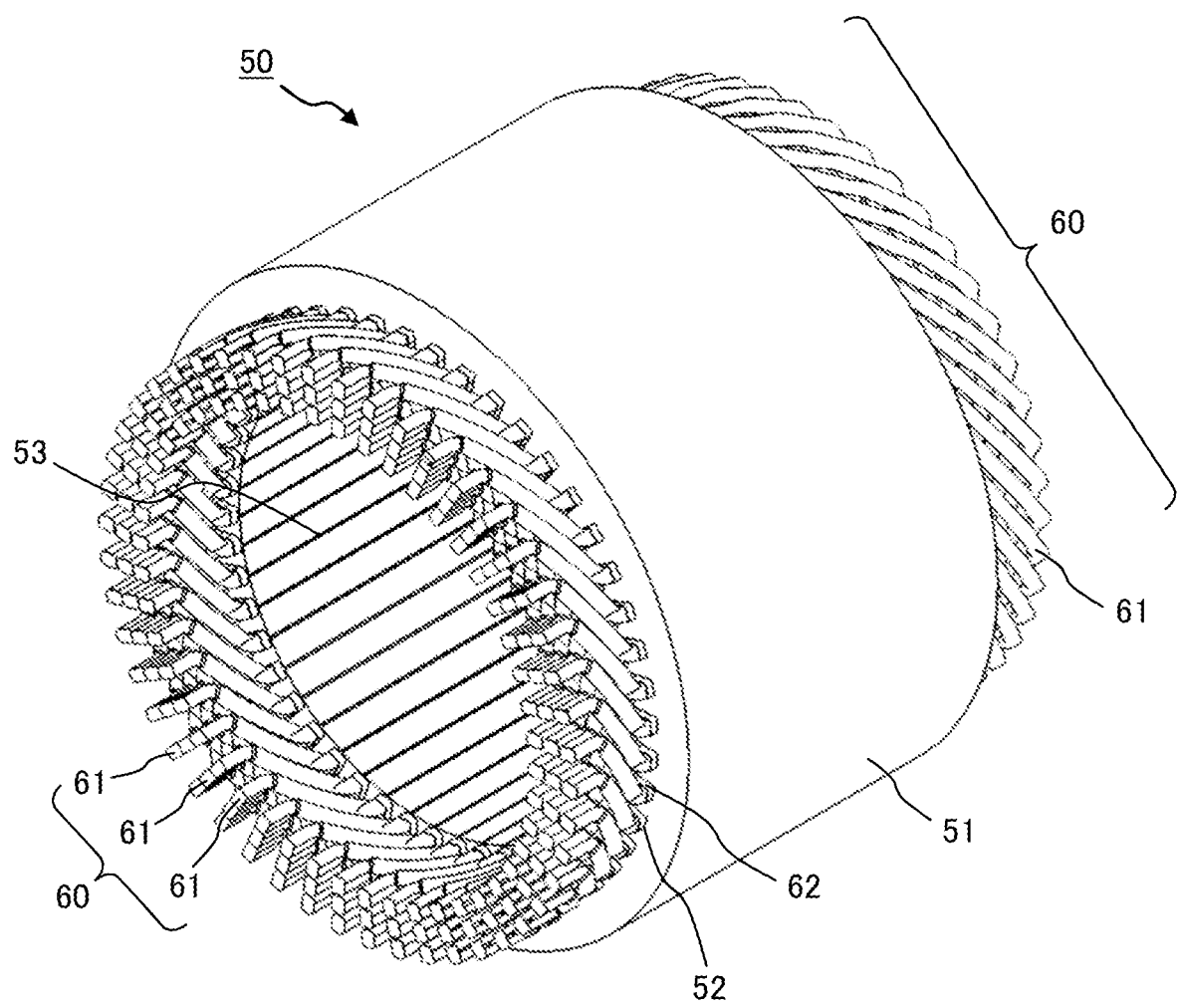
FIG. 3A is a perspective schematic view showing an example of a stator of a dynamo-electric machine.
Figure 3B:
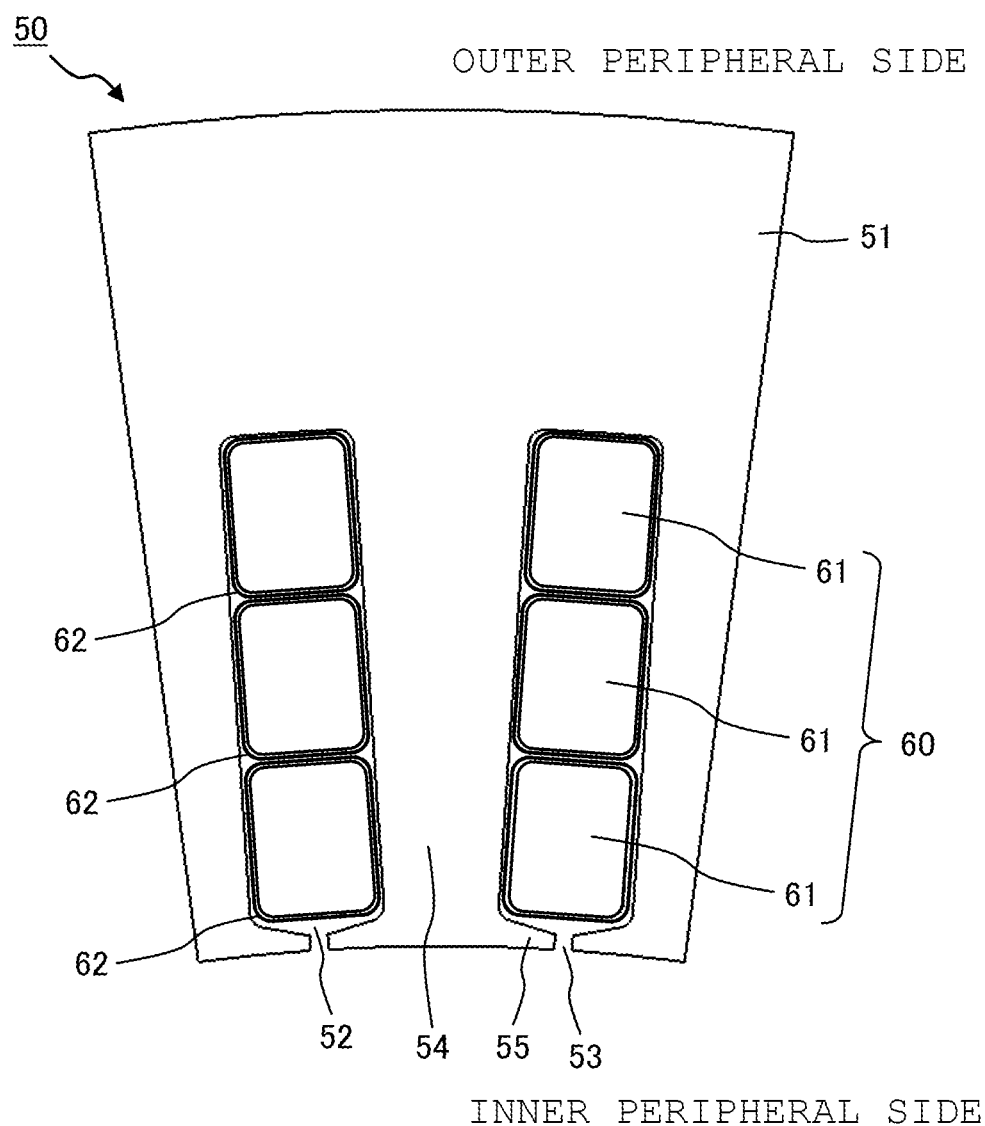
FIG. 3B is an enlarged schematic cross-sectional view of a slot region of the stator.

FIG. 3A is a perspective schematic view showing an example of a stator of a dynamo-electric machine, and FIG. 3B is an enlarged schematic cross-sectional view of a slot region of the stator. The cross section means a cross section orthogonal to the direction of the rotation axis (cross section whose normal line is parallel to the axial direction). In the dynamo-electric machine, a rotor (not illustrated) is disposed radially inside the stator in FIGS. 3A to 3B.

As shown in FIGS. 3A to 3B, a stator 50 is formed by winding a stator coil 60 around a plurality of stator slots 52 formed on the inner peripheral side of an iron core 51. The stator slots 52 are spaces formed to be arrayed at a predetermined circumferential pitch in the circumferential direction of the iron core 51 and formed to penetrate in the axial direction, and slits 53 extending in the axial direction are opened in the innermost peripheral portion. A region partitioned by the adjacent stator slots 52 is referred to as a teeth 54 of the iron core 51, and a portion defining the slit 53 in the tip region on the inner peripheral side of the teeth 54 is referred to as a tooth nail portion 55.

The stator coil 60 is usually composed of a plurality of segment conductors 61. For example, in FIGS. 3A to 3B, the stator coil 60 includes three segment conductors 61 corresponding to U-, V-, and W-phases of three-phase alternating current. Further, from the viewpoint of preventing a partial discharge between each of the segment conductors 61 and the iron core 51 and a partial discharge among the phases (U-, V-, and W-phases), the outer periphery of each of the segment conductors 61 is usually covered with an electrical insulation material 62 (e.g., insulating paper or enamel coating).

The iron core and the dynamo-electric machine, each using the soft magnetic iron sheet of the present invention, are the iron core 51 formed by laminating a large number of the soft magnetic iron sheets of the present invention molded into a predetermined shape in the axial direction and a dynamo-electric machine produced by utilizing the iron core 51, respectively. The soft magnetic iron sheet of the present invention has magnetic properties of exhibiting a high Bs and a low Pi as compared with the electromagnetic pure iron sheet as described above, and thus it is possible to provide an iron core having high conversion efficiency between electric energy and magnetic energy as compared with an iron core using a known electrical steel sheet. The use of the highly efficient iron core leads to miniaturization and increase in the torque of the dynamo-electric machine.

EXAMPLES

Hereinafter, the present invention will be described more specifically with reference to various experiments. However, the present invention is not limited to the configurations and structures described in these experiments.

[Experiment 1]

A commercially available electromagnetic pure iron sheet (thickness=0.1 mm) was prepared as a starting material. The starting material was subjected to a nitrogen immersion heat treatment of holding at 800° C. for 2 hours in an ammonia gas atmosphere (partial pressure=1×105 Pa). At this time, ammonia gas was introduced after the temperature reached 500° C. in the temperature raising process, and intermittent control ($NH_3$ gas and $N_2$ gas were alternately circulated) was performed five times to uniformly adjust the nitrogen concentration to 5 at. % along the thickness direction. Subsequently to the nitrogen immersion heat treatment, a denitrogenation heat treatment of raising the temperature to 820° C. and holding for 5 minutes while lowering the ammonia partial pressure to $1 \times 10^4$ Pa was performed.

Next, the electromagnetic pure iron sheet subjected to the denitrogenation heat treatment was oil-quenched (at 60° C.) of undergoing martensitic transformation, and then subjected to a super-sub-zero treatment of undergoing martensitic transformation of the residual γ phase, and thus a sample A-03 was formed.

FIG. 1A described above shows the results of examination of the nitrogen concentration distribution in the thickness direction of the resulting sample A-03 using EPMA. It is found that a low nitrogen concentration layer (N concentration≈0 at. %, thickness=10 μm) is formed in the surface layer region including both main surfaces of the sample, a high nitrogen concentration layer (N concentration≈5 at. %, thickness=70 μm) is formed in the inner region, and a nitrogen concentration transition layer (average N concentration gradient≈1 at. %/μm, thickness=5 μm) connecting the low nitrogen concentration layer and the high nitrogen concentration layer is formed.

[Experiment 2]

As starting materials, a commercially available electromagnetic pure iron sheet (thickness=0.1 mm) and a commercially available electrical steel sheet (thickness=0.1 mm, C concentration=0.2 at. %) were prepared. Next, samples A-01, A-02, and A-04 to A-12 in which the nitrogen concentration of the high nitrogen concentration layer, the thickness of the low nitrogen concentration layer, and/or the average N concentration gradient of the nitrogen concentration transition layer were different from those of the sample of Experiment 1 were prepared in the same manner as in Experiment 1 except that the partial pressure of the ammonia gas for the nitrogen immersion heat treatment in the nitrogen-concentration-distribution-control heat treatment step and/or the holding temperature and the holding time of the denitrogenation heat treatment were changed. The phase transformation/iron nitride phase formation step was performed in the same manner as in Experiment 1.

The nitrogen concentration distribution in the thickness direction of the resulting samples A-01, A-02, and A-04 to A-12 was examined using EPMA in the same manner as in Experiment 1. The specifications for the samples of Experiments 1 and 2 are summarized in Table 1 below.

[Experiment 3]

As a starting material, the same commercially available electromagnetic pure iron sheet (thickness=0.1 mm) as in Experiment 1 was prepared. The starting material was subjected to only the nitrogen immersion heat treatment (no denitrogenation heat treatment) under the same conditions as in Experiment 1 to prepare a sample A-C1 (sample in which the low nitrogen concentration layer and the nitrogen concentration transition layer were not formed) in which the entire thickness direction was a high nitrogen concentration layer (N concentration≈5 at. %). The phase transformation/iron nitride phase formation step was performed in the same manner as in Experiment 1. This sample A-C1 is a comparative sample for verifying the effects of the low nitrogen concentration layer and the nitrogen concentration transition layer in the surface layer region.

Alternatively, a nitrogen immersion heat treatment with adjusted heat treatment conditions was performed on the same starting material (commercially available electromagnetic pure iron sheet having a thickness of 0.1 mm) to prepare a sample A-C2 having a nitrogen concentration distribution in which a surface layer region (thickness=10 μm) was a high nitrogen concentration layer (N concentration≈5 atom %), and an inner region (thickness=70 μm) was a low nitrogen concentration layer (N concentration≈0 at. %) through a nitrogen concentration transition layer (average N concentration gradient≈1 at. %/μm, thickness=5 μm). The denitrogenation heat treatment was not performed. The phase transformation/iron nitride phase formation step was performed in the same manner as in Experiment 1. This sample A-C2 has a nitrogen concentration distribution exactly opposite to that of the sample A-03, and is a comparative sample for verifying the effects of the low nitrogen concentration layer in the surface layer region.

As a reference for Experiments 1 and 2, a commercially available electromagnetic pure iron sheet (thickness=0.1 mm) itself was used as a reference sample A-R1. The specifications of the comparative samples A-C1 and A-C2 and the reference sample A-R1 prepared in Experiment 3 are also shown in Table 1.

[Experiment 4]

WAXD measurement using a Mo-Kα ray and a Cu-Kα ray was performed on a cross section obtained by stacking 100 sheets of each of the produced samples. Then, the presence or absence of detection of the α phase, the α' phase, the α" phase, and the γ phase as well as the integral intensities of diffraction peaks were calculated by profile fitting. Next, the integral intensities were corrected using the sensitivity coefficient described in the standard data, and the volume ratio of the α" phase and the γ phase were obtained from the ratio of the integral intensities. Further, the ratio "c/a" of the c-axis length to the a-axis length of lattice constant of the α" phase was calculated from the diffraction peak of the α" phase.

As a result of the WAXD measurement, only the α phase was detected in the reference sample A-R1. In the samples other than the reference sample A-R1, the diffraction peaks of the α phase, the α' phase, and the α" phase were detected, and no diffraction peak of the γ phase was detected. The volume ratio of the α" phase is 10 vol % or more, and the ratio "c/a" of the α" phase was in a range of 1.02 to 1.09.

The Bs and Pi were measured as magnetic properties. The magnetization (unit: emu) of the samples was measured under the conditions of a magnetic field of 1.6 MA/m and a temperature of 20° C. using a vibrating sample magnetometer (VSM: BHV-525H, Riken Denshi Co., Ltd.), and the Bs (unit: T) was determined from the volume and the mass of the samples. Further, the $Pi_{1.0/400}$ (unit: W/kg) of each of the samples was measured by the H-coil method using a BH-loop analyzer (IF-BH550, manufactured by IFG Corporation) under the conditions of a magnetic flux density of 1.0 T and 400 Hz and a temperature of 20° C. The results of the magnetic properties are also shown in Table 1.

TABLE 1

Specifications of samples A-R1, A-C1, A-C2, A-01 to A-12 and results of magnetic properties

| Sample No. | Starting material (numerical values are based on at. %) | Surface layer region N concentration (at %) | Surface layer region Thickness (μm) | Nitrogen concentration transition layer Average N concentration gradient (at %/μm) | Nitrogen concentration transition layer Thickness (μm) | Inner region N concentration (at %) | Inner region Thickness (μm) | Magnetic properties Bs (T) | Magnetic properties $Pi_{1.0/400}$ (W/kg) |
|---|---|---|---|---|---|---|---|---|---|
| A-R1 | Electromagnetic pure iron sheet | 0 | 100 | — | — | — | — | 2.14 | 40 |
| A-C1 | | — | — | — | — | 5 | 100 | 2.33 | 90 |
| A-C2 | | 5 | 10 | 1 | 5 | 0 | 70 | 2.21 | 60 |
| A-01 | | 0 | 10 | 1 | 2 | 2 | 76 | 2.25 | 30 |
| A-02 | | 0 | 10 | 1 | 3 | 3 | 74 | 2.26 | 20 |
| A-03 | | 0 | 10 | 1 | 5 | 5 | 70 | 2.28 | 30 |
| A-04 | | 0 | 10 | 1 | 7 | 7 | 66 | 2.29 | Unmeasured |
| A-05 | | 0 | 10 | 1 | 9 | 9 | 62 | 2.32 | Unmeasured |
| A-06 | | 0 | 7 | 1 | 5 | 5 | 76 | 2.28 | 20 |
| A-07 | | 0 | 4 | 1 | 5 | 5 | 81 | 2.29 | 18 |
| A-08 | | 0 | 2 | 1 | 5 | 5 | 87 | 2.32 | 20 |
| A-09 | | 0 | 15 | 2 | 2.5 | 5 | 65 | 2.22 | 20 |
| A-10 | | 0 | 20 | 5 | 1 | 5 | 58 | 2.19 | 30 |
| A-11 | | 0.2 | 20 | 4.8 | 1 | 5 | 58 | 2.20 | 32 |
| A-12 | Fe—0.2%Co | 0 | 20 | 5 | 1 | 5 | 58 | 2.17 | 11 |

As described above, the sample A-R1 shown in Table 1 is the reference sample prepared in Experiment 3, the samples A-C1 and A-C2 are the comparative samples prepared in Experiment 3, the samples A-01, A-02, and A-04 to A-12 are the samples prepared in Experiment 2, and the sample A-03 is the sample prepared in Experiment 1.

As shown in Table 1, in the comparative sample A-C1 in which the entire thickness direction is the high nitrogen concentration layer, the Bs is improved as compared with the reference sample A-R1, and the $Pi_{1.0/400}$ is also increased. In the comparative sample A-C2 in which the low nitrogen concentration layer is formed in the inner region but the low nitrogen concentration layer is not formed in the surface layer region, the $Pi_{1.0/400}$ is decreased as compared with the comparative sample A-C1, but the $Pi_{1.0/400}$ is increased as compared with the reference sample A-R1.

On the other hand, it is found that, in the samples A-01 to A-12 of the present invention, the Bs is improved and the Pi is decreased as compared with the reference sample A-R1. These results confirm that the high nitrogen concentration layer (formation of the α" phase resulting therefrom), which is the configuration of the soft magnetic iron sheet of the present invention, contributes to an improvement in the Bs, meanwhile the low nitrogen concentration layer and the nitrogen concentration transition layer contribute to a reduction in the $Pi_{1.0/400}$.

In addition, from the comparison between the comparative sample A-C2 and the comparative sample A-03, it is confirmed that the low nitrogen concentration layer in the surface layer region contributes to a reduction in the $Pi_{1.0/400}$. This is considered to be because the presence of a layer having a low Hc in the surface layer region increases the response to magnetization variation relative to the variation of the external magnetic field, thereby reducing the $Pi_{1.0/400}$. In other words, it is considered that when a layer having a high Hc is present in the surface layer region, the surface layer region acts as a magnetic shield to block the response to the magnetization variation in the inner region.

[Experiment 5]

Commercially available pure metal raw materials (Fe and Co each having a purity=99.9%) were mixed so as to have a desired alloy composition, and the resultant mixture was subjected to arc melting (in an automatic arc melting furnace, manufactured by Diavac Limited, in a reduced-pressure Ar atmosphere) on water-cooled copper hearth to produce an alloy ingot. At this time, to homogenize the alloy ingot, remelting was repeated six times while inverting the sample. The resulting alloy ingot was pressed and rolled to prepare a Fe—Co alloy sheet (thickness=0.1 mm) as a starting material.

The starting material was subjected to a nitrogen immersion heat treatment of holding at 700° C. for 2 hours in an ammonia gas atmosphere (partial pressure=1×10$^5$ Pa). At this time, ammonia gas was introduced after the temperature reached 500° C. in the temperature raising process, and intermittent control (NH$_3$ gas and N$_2$ gas were alternately circulated) was performed five times to uniformly adjust the nitrogen concentration to 5 at. % along the thickness direction. Subsequently to the nitrogen immersion heat treatment, a denitrogenation heat treatment of raising the temperature to 750° C. and holding for 5 minutes while lowering the ammonia partial pressure to 1×10$^4$ Pa was performed. Thereafter, the oil quenching (at 60° C.) and the super-sub-zero treatment were performed in the same manner as in Experiment 1 to form a sample B-03 of the present invention.

The nitrogen concentration distribution in the thickness direction of the resulting sample B-03 was examined using EPMA in the same manner as in Experiment 1, and it was confirmed that the nitrogen concentration distribution similar to FIG. 1A was formed.

[Experiment 6]

In the same manner as in Experiment 5, commercially available pure metal raw materials (Fe, Co, and V each having a purity=99.9%) were mixed and melted to prepare an alloy ingot having a desired alloy composition. The resulting alloy ingot was pressed and rolled to prepare a Fe—Co alloy sheet (thickness=0.1 mm) as a starting material.

Next, samples B-01, B-02, and B-04 to B-15 in which the nitrogen concentration of the high nitrogen concentration layer, the thickness of the low nitrogen concentration layer, and/or the average N concentration gradient of the nitrogen concentration transition layer were different from those of the sample B-03 of Experiment 5 were prepared in the same manner as in Experiment 5 except that the partial pressure of the ammonia gas for the nitrogen immersion heat treatment in the nitrogen-concentration-distribution-control heat treatment step and/or the holding temperature and the holding time of the denitrogenation heat treatment were changed. The phase transformation/iron nitride phase formation step was performed in the same manner as in Experiment 1.

The nitrogen concentration distribution in the thickness direction of the resulting samples B-01 to B-02 and B-04 to B-15 was examined using EPMA in the same manner as in Experiment 1. The specifications for the samples of Experiments 5 and 6 are summarized in Table 2 below.

[Experiment 7]

The starting material prepared in Experiment 5 was subjected to only the nitrogen immersion heat treatment (no denitrogenation heat treatment) under the same conditions as in Experiment 5 to prepare a sample B-C1 in which the entire thickness direction was a high nitrogen concentration layer (N concentration≈5 at. %). The phase transformation/iron nitride phase formation step was performed in the same manner as in Experiment 1. This sample B-C1 is a comparative sample for verifying the effects of the low nitrogen concentration layer and the nitrogen concentration transition layer. As a reference for Experiments 5 and 6, the starting material itself was used as a reference sample B-R1. The specifications of the comparative sample B-C1 and the reference sample B-R1 prepared in Experiment 7 are also shown in Table 2.

[Experiment 8]

In the same manner as in Experiment 4, the resulting samples were subjected to WAXD measurement, the detected phases were identified, and the volume ratio of the α″ phase and the γ phase and the ratio "c/a" of the c-axis length to the a-axis length of lattice constant of the α″ phase were determined. As a result, only the α phase was detected in the reference sample B-R1. In the samples other than the reference sample B-R1, the diffraction peaks of the α phase, the α' phase, and the α″ phase were detected, and no diffraction peak of the γ phase was detected. The volume ratio of the α″ phase is 10 vol % or more, and the ratio "c/a" of the α″ phase was in a range of 1.02 to 1.09.

In addition, magnetic properties: Bs and $Pi_{1.0/400}$ were measured in the same manner as in Experiment 4. The results of the magnetic properties are also shown in Table 2.

TABLE 2

Specifications of samples B-R1, B-C1, B-01 to B-15 and results of magnetic properties

| Sample No. | Starting material (numerical values are based on at. %) | Surface layer region N concentration (at %) | Surface layer region Thickness (μm) | Nitrogen concentration transition layer Average N concentration gradient (at %/μm) | Nitrogen concentration transition layer Thickness (μm) | Inner region N concentration (at %) | Inner region Thickness (μm) | Magnetic properties Bs (T) | Magnetic properties $Pi_{-1.0/400}$ (W/kg) |
|---|---|---|---|---|---|---|---|---|---|
| B-R1 | Fe—20%Co | 0 | 100 | — | — | — | — | 2.31 | 35 |
| B-C1 | | — | — | — | — | 5 | 100 | 2.33 | 80 |
| B-01 | | 0 | 10 | 1 | 2 | 2 | 76 | 2.40 | 30 |
| B-02 | | 0 | 10 | 1 | 3 | 3 | 74 | 2.41 | 20 |
| B-03 | | 0 | 10 | 1 | 5 | 5 | 70 | 2.42 | 30 |
| B-04 | | 0 | 10 | 1 | 7 | 7 | 66 | 2.42 | Unmeasured |
| B-05 | | 0 | 10 | 1 | 9 | 9 | 62 | 2.45 | Unmeasured |
| B-06 | | 0 | 7 | 1 | 5 | 5 | 76 | 2.45 | 15 |
| B-07 | | 0 | 4 | 1 | 5 | 5 | 81 | 2.45 | 16 |
| B-08 | | 0 | 15 | 2 | 2.5 | 5 | 65 | 2.41 | 17 |
| B-09 | | 0 | 20 | 5 | 1 | 5 | 58 | 2.39 | 19 |
| B-10 | | 0.2 | 20 | 4.8 | 1 | 5 | 58 | 2.42 | 20 |
| B-11 | Fe—20%Co—1%V | 0 | 20 | 5 | 1 | 5 | 58 | 2.31 | 9 |
| B-12 | Fe—10%Co | 0 | 15 | 2 | 2.5 | 5 | 65 | 2.35 | 15 |
| B-13 | Fe—5%Co | 0 | 15 | 2 | 2.5 | 5 | 65 | 2.31 | 14 |
| B-14 | Fe—2%Co | 0 | 15 | 2 | 2.5 | 5 | 65 | 2.27 | 15 |
| B-15 | Fe—1%Co | 0 | 15 | 2 | 2.5 | 5 | 65 | 2.21 | 18 |

As described above, the sample B-R1 shown in Table 2 is the reference sample prepared in Experiment 7, the sample B-C1 is the comparative sample prepared in Experiment 7, the samples B-01, B-02, and B-04 to B-15 are the samples prepared in Experiment 6, and the sample B-03 is the sample prepared in Experiment 5.

As shown in Table 2, in the comparative sample B-C1 in which the entire thickness direction is the high nitrogen concentration layer, the Bs is improved as compared with the reference sample B-R1, and the $Pi_{-1.0/400}$ is also increased. On the other hand, it is found that, in the samples B-01 to B-15 of the present invention, the Bs is improved and the $Pi_{-1.0/400}$ is decreased as compared with the reference samples B-R1 and A-R1. These results confirm that the high nitrogen concentration layer (formation of the α" phase resulting therefrom), which is the configuration of the soft magnetic iron sheet of the present invention, contributes to an improvement in the Bs, meanwhile the low nitrogen concentration layer and the nitrogen concentration transition layer contribute to a reduction in the $Pi_{-1.0/400}$.

[Experiment 9]

Prepared was a thin sheet material in which Co films (each thickness=0.01 mm) were deposited on both main surfaces of a commercially available electromagnetic pure iron sheet (thickness=0.08 mm). Next, the thin sheet material was subjected to a heat treatment (cobalt diffusion heat treatment) of holding at 1000° C. for 5 hours in a nitrogen atmosphere (partial pressure=$1 \times 10^5$ Pa). The thin sheet material subjected to the cobalt diffusion heat treatment was used as a starting material.

The starting material was subjected to a nitrogen immersion heat treatment of holding at 700° C. for 2 hours in an ammonia gas atmosphere (partial pressure=$1 \times 10^5$ Pa). At this time, ammonia gas was introduced after the temperature reached 500° C. in the temperature raising process, and intermittent control ($NH_3$ gas and $N_2$ gas were alternately circulated) was performed five times to uniformly adjust the nitrogen concentration to 5 at. % along the thickness direction. Subsequently to the nitrogen immersion heat treatment, a denitrogenation heat treatment of raising the temperature to 800° C. and holding for 5 minutes while lowering the ammonia partial pressure to $1 \times 10^4$ Pa was performed. Thereafter, the oil quenching (at 60° C.) and the super-sub-zero treatment were performed in the same manner as in Experiment 1 to form a sample C-01 of the present invention.

Figure 4:
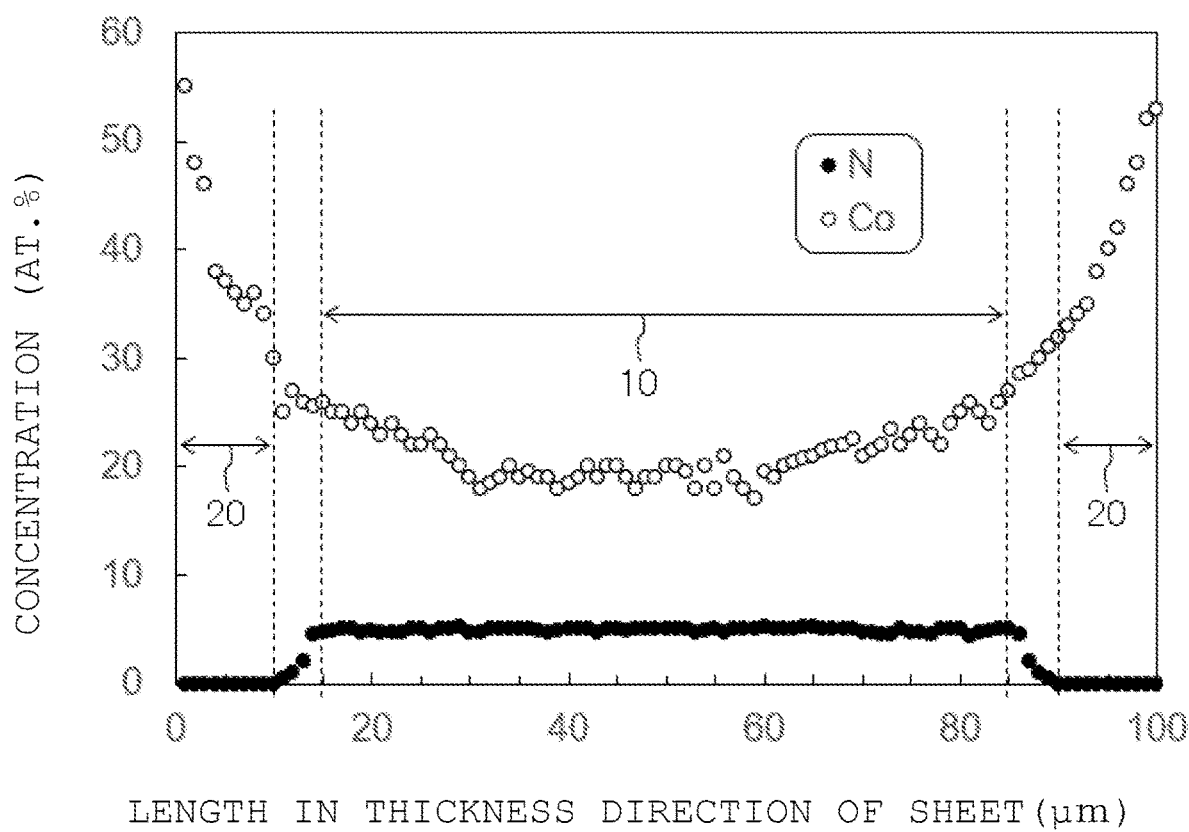
FIG. 4 is a graph showing a nitrogen concentration distribution and a cobalt concentration distribution in a thickness direction in a sample C-01 of the present invention.

The nitrogen concentration distribution in the thickness direction of the resulting sample was examined using EPMA. The results are shown in FIG. 4. FIG. 4 is a graph showing a nitrogen concentration distribution and a cobalt concentration distribution in a thickness direction in a sample C-01.

As shown in FIG. 4, with respect to the nitrogen concentration distribution, it is found that a low nitrogen concentration layer (N concentration≈0 at. %, thickness=10 μm) is formed in the surface layer region including both main surfaces of the sample, a high nitrogen concentration layer (N concentration≈5 at. %, thickness=70 μm) is formed in the inner region, and a nitrogen concentration transition layer (average N concentration gradient≈1 at. %/μm, thickness=5 μm) connecting the low nitrogen concentration layer and the high nitrogen concentration layer is formed.

Regarding the cobalt concentration distribution, it is found that the sample has a relatively high cobalt concentration (about 30 to 55 at. %) in the surface layer region (thickness=10 μm) including both main surfaces, and has a relatively low cobalt concentration (about 20 at. %) in the inner region (thickness=40 μm), the concentration being gradually decreased toward the inside. It is confirmed that the cobalt diffusion heat treatment enables formation of the cobalt concentration distribution in the thickness direction of the soft magnetic iron sheet.

Next, the magnetic properties (Bs, $Pi_{-1.0/400}$) of the sample C-01 were measured in the same manner as in Experiment 4, and the results (Bs=2.45 T, $Pi_{-1.0/400}$=10 W/kg) were obtained. The magnetic properties of the sample C-01 show a high Bs comparable to Permendur (Fe-49 mass %-2 mass % V) and a $Pi_{-1.0/400}$ lower than Permendur. Since the surface layer region of the sample C-01 has a low nitrogen concentration and a high cobalt concentration, it is considered that a Fe—Co alloy layer is substantially formed. Furthermore, it is considered that the low coercive force of the Fe—Co alloy contributes to a reduction in the $Pi_{-1.0/400}$ of the entire sample.

The results of the sample C-01 show that, in order to attain a high Bs and a low $Pi_{-1.0/400}$, it is effective to form a concentration distribution for increasing the cobalt concentration in the surface layer region, in addition to the formation of the low nitrogen concentration layer in the surface layer region, the high nitrogen concentration layer in the inner region, and the nitrogen concentration transition layer connecting those layers, like the samples B-03 and B-06. Furthermore, the sample C-01 has an advantage that the material cost can be reduced because the amount of Co used as a whole is smaller than that of Permendur.

[Experiment 10]

Prepared was a thin sheet material in which Co films (each thickness=0.01 mm) were deposited on both main surfaces of a commercially available electromagnetic pure iron sheet (thickness=0.08 mm). Next, the thin sheet material was subjected to a cobalt diffusion heat treatment at 1000° C. in a nitrogen atmosphere (partial pressure=$1 \times 10^5$ Pa). At this time, the cobalt concentration distribution was adjusted by controlling the holding time at 1000° C. In Experiment 10, the thin sheet materials in which the cobalt concentration distribution was adjusted were used as samples for the soft magnetic iron sheet.

The cobalt concentration distribution on the prepared soft magnetic iron sheet samples was examined using EPMA, and the magnetic properties (Bs, $Pi_{-1.0/400}$) were measured. As a result, the sample in which the cobalt concentration in the surface layer region having a thickness of 10 μm was 5 to 70 at. % and the cobalt concentration in the inner region having a thickness of 40 μm was 0 to 2 at. % had magnetic properties: Bs=2.25 T, $Pi_{-1.0/400}$=20 W/kg. The sample in which the cobalt concentration in the surface layer region having a thickness of 10 μm was 30 to 60 at. % and the cobalt concentration in the inner region having a thickness of 40 μm was 20 to 25 at. % had magnetic properties: Bs=2.35 T, $Pi_{-1.0/400}$=15 W/kg.

The above-described embodiments and experiments have been described to help understanding of the present invention, and the present invention is not limited only to the specific configurations described. For example, it is possible to replace a part of the configuration of an embodiment with a configuration on the basis of the technical common sense of those skilled in the art, and it is also possible to add the configuration on the basis of the technical common sense of those skilled in the art to the configuration of the embodiment. Hence, in the present invention, as for some of the configurations of the embodiments and experiments of the present specification, another configuration can be added, and a part of the configuration can be deleted or replaced with another configuration, without departing from the technical idea of the invention.

REFERENCE SIGNS LIST 10 high nitrogen concentration layer
20 low nitrogen concentration layer
30 nitrogen concentration transition layer
50 stator
51 iron core
52 stator slot
53 slit
54 teeth
55 tooth nail portion
60 stator coil
61 segment conductor
62 electrical insulation material

The invention claimed is:

1. A soft magnetic iron sheet comprising: iron as a main component; nitrogen; and cobalt,
   wherein the soft magnetic iron sheet includes, in a thickness direction of the soft magnetic iron sheet: a high nitrogen concentration layer having a nitrogen concentration of 2 at. % or more and 11 at. % or less; a low nitrogen concentration layer having a nitrogen concentration of half or less of the nitrogen concentration of the high nitrogen concentration layer; and a nitrogen concentration transition layer connecting the nitrogen concentration of the high nitrogen concentration layer and the nitrogen concentration of the low nitrogen concentration layer,
   wherein a surface layer region including at least both main surfaces of the soft magnetic iron sheet is the low nitrogen concentration layer, and the high nitrogen concentration layer is in an inner region, and
   wherein the soft magnetic iron sheet has a cobalt concentration distribution in which a concentration of the cobalt in the surface layer region is higher than a concentration of the cobalt in the inner region, along the thickness direction of the soft magnetic iron sheet.

2. The soft magnetic iron sheet according to claim 1, wherein the nitrogen concentration transition layer has an average nitrogen concentration gradient of 0.1 at. %/μm or more and 10 at. %/μm or less.

3. The soft magnetic iron sheet according to claim 1, wherein the low nitrogen concentration layer has a nitrogen concentration of 1 at. % or less.

4. The soft magnetic iron sheet according to claim 1, having a saturation magnetic flux density of more than 2.14 T, and an iron loss, under conditions of a magnetic flux density of 1.0 T and a frequency of 400 Hz, of less than 40 W/kg.

5. The soft magnetic iron sheet according to claim 1, wherein the soft magnetic iron sheet has a thickness of 0.01 mm or more and 1 mm or less.

6. The soft magnetic iron sheet according to claim 1, comprising: an $\alpha$ phase; an $\alpha'$ phase; and an $\alpha''$ phase,
   wherein the $\alpha$ phase is a main phase and the $\alpha''$ phase has a volume ratio of 10% or more.

7. The soft magnetic iron sheet according to claim 6, wherein the $\alpha''$ phase is a crystal phase in which a ratio of a c-axis length to an a-axis length of lattice constant is different from a ratio of a c-axis length to an a-axis length of lattice constant of $Fe_{16}N_2$ having a stoichiometric composition.

8. The soft magnetic iron sheet according to claim 1, wherein a total of elements other than the iron and the nitrogen is less than 1 at. %.

9. The soft magnetic iron sheet according to claim 1, wherein the concentration of cobalt in the surface layer region is about 30 at. % to 60 at. % and the concentration of cobalt in the inner region is about 20 at. % to 25 at %.

10. The soft magnetic iron sheet according to claim 9, wherein the concentration of cobalt in the surface layer region is about 30 at. % to 55 at. % and the concentration of cobalt in the inner region is about 20 at. %.

11. An iron core comprising a laminated body of soft magnetic iron sheets, wherein the soft magnetic iron sheets are the soft magnetic iron sheets according to claim 1.

12. A dynamo-electric machine comprising an iron core, wherein the iron core is the iron core according to claim 11.

\* \* \* \* \*